Nov. 5, 1968     R. A. ELM     3,409,257
CABLE CLIP WITH PRESSURE SENSITIVE ATTACHING MEANS
Filed March 10, 1967
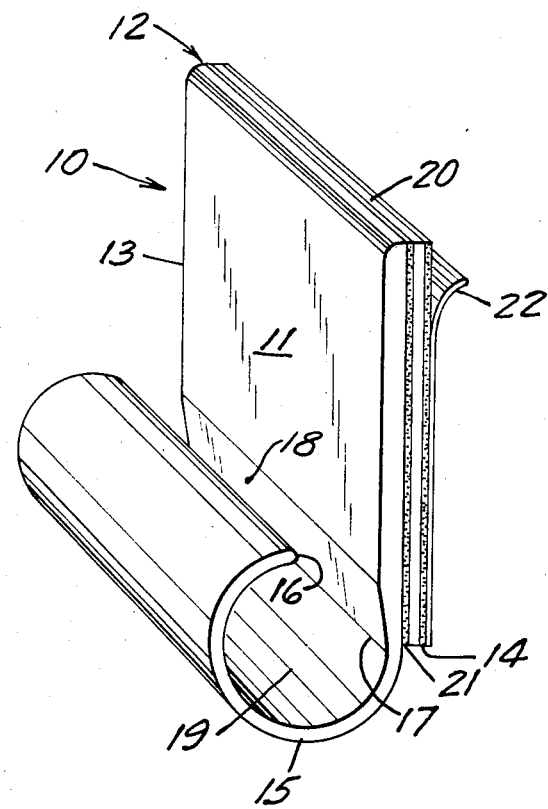
INVENTOR.
ROBERT A. ELM
BY
Carpenter, Kinney & Boulter
ATTORNEYS 3,409,257
CABLE CLIP WITH PRESSURE SENSITIVE
ATTACHING MEANS
Robert A. Elm, St. Paul, Minn., assignor to Minnesota
Mining and Manufacturing Company, St. Paul, Minn.,
a corporation of Delaware
Filed Mar. 10, 1967, Ser. No. 622,320
1 Claim. (Cl. 248—65)

ABSTRACT OF THE DISCLOSURE

An adherent cable clip having a generally J-shaped cross section, being molded from stiff resilient plastic, and having a tape-like resilient conformable pressure sensitive adhesive composite secured to a flat back surface thereof for attaching the clip to various wall surfaces.

BACKGROUND OF INVENTION

Field of invention

The device of the present invention relates to means for attaching electrical cables, such as telephone cords and the like, to supporting surfaces such as baseboards and desk surfaces. More particularly the device relates to a clip which is self adherable to a variety of wall surfaces without the need of drilling holes or otherwise marring the surface and which removably receives and engages electrical cords or cables.

Description of the prior art

One prior art device, used for example in attaching telephone cords to baseboards and desk surfaces, is a metal clip having a generally hemicylindrical cord holding portion and a perforate mounting plate extending radially from one edge. The clip is attached to the baseboard or desk by screw type fasteners passing through the hole in the mounting plate into the wall structure, and the cord is held against the wall by and within the hemicylindrical portion. Application of this type of clip necessitates drilling or making holes in wall surfaces and requires the use of a screwdriver or other tool. Additionally, mounting involves cumbersome holding of the cord within the hemicylindrical portion of the clip and against the wall while at the same time tightening the screw.

SUMMARY OF THE INVENTION

The device of the present invention permits easy and convenient attachment of cables, such as telephone cords, to desks or other supporting surfaces without marring or otherwise disfiguring the surface. No screws, drills, or other tools, are required to mount the clip of the present invention which is strongly self adherable to wall surfaces and which conveniently and removably receives and engages electrical cables. The clip may be mounted easily and durably to any of a variety of supporting surfaces including those which cannot easily be drilled or perforated, such as marble, glass, and metal. And the cable can be securely connected to and, when desired, removed from a mounted clip by simple finger manipulation. These advantages and others are obtained by employing a resilient plastic clip, the body of which has a generally J-shaped cross section and providing the same, on the back flat surface, with a resilient, conformable, and strong pressure-sensitive adhesive composite.

DESCRIPTION OF THE DRAWING

The invention will be more particularly described with reference to the accompanying drawing which is an enlarged perspective view of a preferred form of clip and in which the thickness of the adhesive composite is exaggerated to illustrate the different layers. For the purpose of the following description and claim, the clip may be referred to as having a front, back, top and bottom (the front facing left in the drawing), but it is to be understood that the clip may be mounted effectively in a variety of positions.

DESCRIPTION OF THE PREFERRED EMBODIMENT

Clip 10 comprises generally a stiff, resilient, plastic body member 11 and a resilient and conformable pressure sensitive adhesive composite 12 secured to a back surface thereof.

Body 11 of clip 10 is formed from a stiff resilient, insulating plastic such as vinyl or nylon and has a generally J-shaped cross section. Stem portion 13 of body 11 is generally a flat plate thick enough to assure sufficient rigidity to resist bending or deformation under finger pressure upon the front surface and thus to transfer localized pressure evenly along the outer adhesive surface 14 when the clip 10 is applied to a wall surface. Once the clip 10 is applied to a wall surface and placed in use, the thickened stem portion 13 transfers those removal stresses which may act obliquely with respect to the plane of the stem 13 evenly along the interface between the outer layer of adhesive 14 and the supporting surface.

The thinner, approximately three-quarters round hook portion 15 of body 11 is thinnest adjacent the free end 16 of the hook and gradually becomes thicker up to the juncture 17 with the stem 13. By making the hook 15 thinner towards hook end 16, deformation of the hook 15 by forces applied near the free end 16 as during insertion of a cable, is uniformly increased between the stem and the free end, thereby avoiding any tendency of the hook to break off during such manipulation.

The thickness of stem 13 beginning at juncture 17 gradually uniformly increases over a short distance, forming a slant face 18. Face 18 serves the dual purpose of helping to hold an inserted cable within hook 15 and of permitting placement of the cable as close as possible to the wall surface, for achieving both improved appearance and maximum holding power.

As an example of dimensions of one standard size of the preferred embodiment of the invention, suitable for cables having outside diameters within the approximate range of $15/64$ inch to $20/64$ inch, the width of the clip 10 as viewed in the drawing is 1½ inches and the overall heighth is .90 inch. The stem portion 13 is .05 inch thick and is rounded off at the top. The inside diameter of the hook portion 15 is .230 inch, and the thickness increases from .022 inch adjacent the point of the hook 16 to .030 inch at the juncture 17 with the stem 13. The opening for entrance of the cable, i.e. the horizontal distance between hook end 16 and the front surface of stem 13, is .125 inch. Slant face 18 in the present example is formed by increasing the thickness of stem 13, beginning at juncture 17, from .030 inch to .050 inch over a short distance of about .14 inch. Stiff, resilient plastic, such as rigid polyvinylchloride, is preferred, and when formed to these dimensions provides a sufficiently rigid stem portion 13 for maximum effectiveness of the adhesive composite 12 and a sufficiently resiliently deformable hook portion 15 for permitting finger-induced deflection for insertion or removal of the cable while still firmly retaining and supporting an inserted cable.

A tape-like foam-layer pressure-sensitive adhesive composite 12 coextensively covers the back surface of the stem portion 13 of clip 10. For this purpose, use can be made of mounting tape products such as described in the copending application of Engdahl and Buchholtz, Ser. No. 188,479, filed Apr. 18, 1962. In the preferred embodiment, the adhesive composite 12 includes a polyurethane foam layer 20 which is 1/32 inch thick and which has extremely thin layers, e.g., 2 or 3 mils thick, of normally tacky pressure sensitive adhesive 14 and 21 on both sides. On larger sized clips it is found preferable to use somewhat thicker mounting tape, e.g., having a 1/16 inch foam layer. Additionally a removable liner 22 protects the outside layer of pressure sensitive adhesive 14 until removed by peeling off prior to application of the clip 10 to a wall surface. Mounting tapes of the kind above referred to permit durable attachment of the clip to a variety of rough or irregular wall surfaces such as wood, concrete, and plaster, as well as to the had smooth surfaces of glass, marble, or metal.

The clip 10 is easily and inexpensively manufactured. Lengths of the body member 11, for example 48 inches, can be extrusion molded from an extrusion grade plastic and an equal length of mounting tape 12 can then be applied to the flat back surface of the stem 13. The combined plastic body member 11 and tape composite 12 can then be divided into appropriately sized clips, for example 1½ inches wide as recited in the beforementioned embodiment. In some instances it may be preferable to supply the undivided extrusion and tape to the user who can then cut it to the desired width.

The combination of the J-shaped body member 11 and the resilient conformable foam-layer pressure-sensitive adhesive composite 12 produces a structure which when applied either to smooth or rough or irregular wall surfaces can withstand a surprising amount of shear force. Preferably the clip 10 is mounted so that the shear forces, e.g. as produced by the weight of a cord, are exerted oppositely the opening of the hook 15 and perpendicular to its centerline and in the same direction as the plane of the stem 13, i.e. as would occur if a horizontally running cable were inserted in the clip 10 shown in the drawing, e.g. as in supporting a cord along a baseboard. But the clip 10 may be mounted in other positions effectively, e.g. the clip 10 can be used to run a cord or cable vertically or at an angle along either walls or desks, because when an appropriate size clip 10 is used, the hook 15 snugly grasps the inserted cable and supports it. And adhesive composite 12 is strong enough to withstand removal stresses acting in other than normal directions, e.g. at an angle or inclined to the centerline of the tubular hook 15.

The clip 10, after first removing the protective liner 22, may be applied, for example, to the side of a desk by applying finger pressure upon the front surface of the stem 13. The cable is then inserted, preferably and most easily, by placing it along the opening of hook 15, i.e. between the front surface of stem 13 and the lip of the hook or hook end 16, and twisting or rolling it into the hook cavity. Thus it is seen that the clip may be easily applied without screws or a drill or other tools, and without marring the substructure, and the cable is thereafter easily inserted or removed by simple finger manipulation.

What is claimed is:

1. An adherent cable clip (10) suitable for removably attaching telephone cords or the like to flat structural surfaces, said clip comprising a body member (11) having a generally J-shaped cross section and being formed of stiff, resilient, insulating plastic, said J-shaped body member having a tubular hook portion (15) extending at juncture (17) from along one entire edge of a thicker, substantially flat stem portion (13), said hook portion being approximately three quarters round, having a cross section which gradually becomes thicker from adjacent the point of the hook end (16) up to said juncture, and being sufficiently resilient to permit entry and removal of the cord by finger manipulation, said thicker stem portion being of sufficient thickness to be substantially rigid, having a flat back surface, and having a slant face (18) adjacent said juncture; and adhering means (12) coextensively secured to said flat back surface by a pressure sensitive adhesive (21) and comprising a layer of resilient conformable foam (20) and an outer layer of pressure sensitive adhesive (14).

References Cited
UNITED STATES PATENTS

| | | | |
|---|---|---|---|
| 2,672,314 | 3/1954 | Mitchell | 248—65 X |
| 2,862,626 | 12/1958 | Clare | 248—205 X |
| 3,016,224 | 1/1962 | Hall | 248—205 |
| 3,169,005 | 2/1965 | Wallach | 248—74 |

CHANCELLOR E. HARRIS, *Primary Examiner.*